April 28, 1925.
W. L. SCHELLENBACH
1,535,346
LATHE
Filed April 17, 1922
2 Sheets-Sheet 1
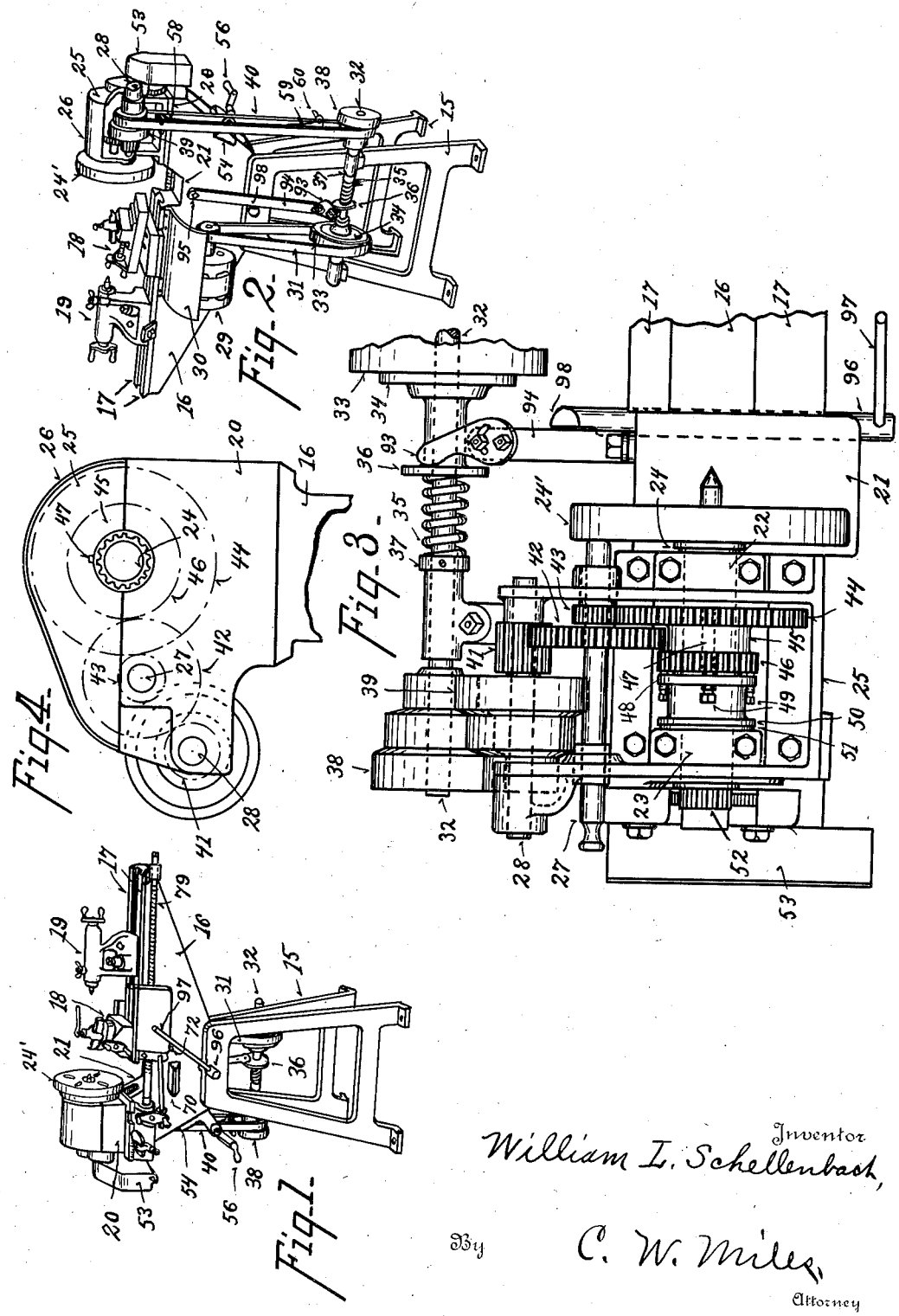
Inventor
William L. Schellenbach,
By C. W. Miles,
Attorney

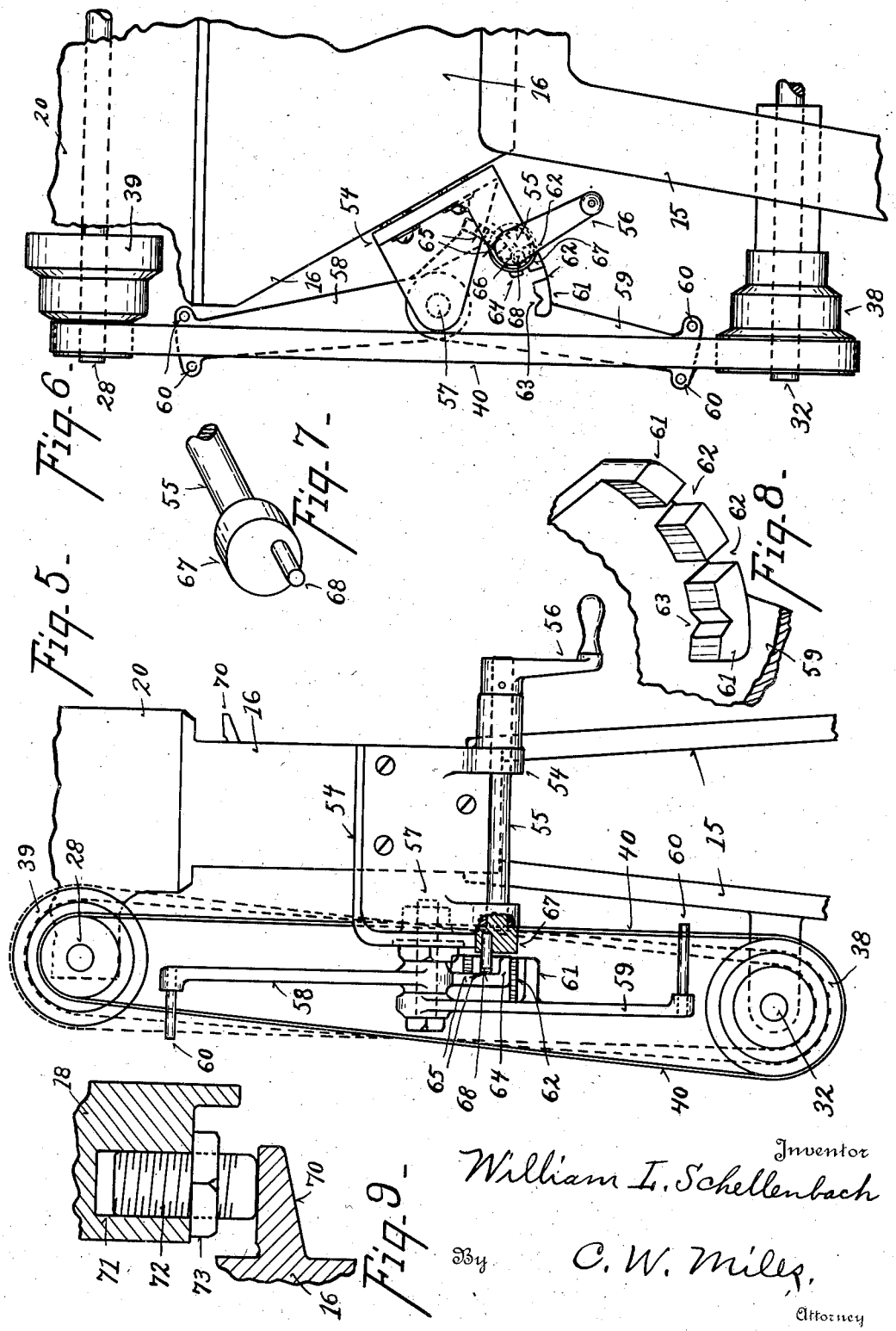

Patented Apr. 28, 1925.

1,535,346

UNITED STATES PATENT OFFICE.

WILLIAM L. SCHELLENBACH, OF WYOMING, OHIO.

LATHE.

Application filed April 17, 1922. Serial No. 553,612.

*To all whom it may concern:*

Be it known that I, WILLIAM L. SCHELLENBACH, a citizen of the United States, residing at Wyoming, in the county of Hamilton and State of Ohio, have invented certain new and useful Improvements in Lathes, of which the following is a specification.

My invention relates to improvements in engine lathes. One of its objects is to provide improved lathe spindle driving means. Another object is to provide an improved lathe bed with gap arrangement and tool carriage support for taking and turning work of large diameter close to the headstock. Another object is to provide improved lathe speed change mechanism. Another object is to provide improved self contained counter shaft and speed change mechanism. Another object is to provide improved belt shifting speed changing means. My invention also comprises certain details of form, combination and arrangement all of which will be fully set forth in the description of the accompanying drawings in which.

Fig. 1 is a perspective view of my improved lathe, from the front thereof.

Fig. 2, is a perspective view of the same from the rear thereof.

Fig. 3, is a plan of the headstock and part of the spindle driving mechanism.

Fig. 4, is a diagrammatic end view of the headstock showing the spindle driving speed change apparatus.

Fig. 5, is a detail end elevation of the belt shifting apparatus.

Fig. 6, is a front elevation of the apparatus shown in Fig. 5.

Fig. 7, is a perspective detail of a portion of the belt shifting apparatus detached.

Fig. 8, is a perspective detail of another portion of the belt shifting apparatus detached.

Fig. 9, is a sectional detail of a portion of the tool carriage supporting means.

The accompanying drawings illustrate the preferred embodiment of my invention in which 15 represents the supporting frame and 16 the bed of the lathe. The bed of the lathe is provided with guide ways 17 along which a tool carriage 18 and tailstock 19 and steady rest, not shown, are adjustable to and from the lathe headstock 20. The lathe bed is also provided with a gap 21 in the ways 17 in front of the headstock to enable work of relatively large diameter to be operated upon.

The headstock 20 is provided with two journal bearings 22 and 23 to rotatably support a tubular lathe spindle 24 having a bore of greater diameter than usual, to enable rods and tubes of considerable diameter to be inserted through the bore of the spindle. A headstock cap-member 25 is bolted to the headstock to form the upper portions of the journal bearings 22 and 23 for the lathe spindle, said cap-member 25 being an open framework closed on top by means of a detachable sheet metal housing member 26. The headstock 20 is also provided with journal bearings for a gear supporting and shifting shaft 27, and also bearings for a cone pulley shaft 28. A face plate 24' is detachably mounted upon the lathe spindle.

The lathe is preferably driven directly from an electric motor 29 mounted at the rear upon the lathe frame and protected by a sheet metal apron or housing 30. A belt 31 from the motor 29 drives a counter-shaft 32 through a belt pulley 33 loosely mounted upon the counter shaft 32 and adapted to be clutched to the counter-shaft by means of a friction clutch disk 34 splined to the counter-shaft 32 and normally held in engagement with the belt pulley 33 by means of a coiled spring 35 interposed between the hub or flange 36 of the clutch disk 34 and a collar 37 rigid on the counter shaft 32. The counter-shaft 32 is preferably mounted or journaled low down on the rear of the lathe frame and is provided with a cone pulley 38 in line with a cone pulley 39 mounted upon the shaft 28. A belt 40 drives the cone-pulley shaft 28 at variable speed from the counter-shaft 32.

In addition to the cone pulley 39 the shaft 28 is provided with an elongated pinion 41 which meshes with and drives a gear 42 on the shaft 27. The shaft 27 is also provided with a gear or pinion 43, and the shaft 27 is adapted to be shifted endwise in its bearings so as to mesh the pinion 43 with a gear 44 carried by a sleeve 45 mounted upon the lathe spindle 24 and with the gear 42 traveling idle, or so as to mesh the gear 42 with a gear 46 on the sleeve 45 with the pinion 43 traveling idle. The pinion 41 is long enough to provide for shifting the shaft 27 endwise without disengaging the gear 42 from driving relation with the pinion 41. By shifting the shaft 27 endwise the lathe spindle may be driven at two different speeds relative to shaft 27 and 28, and shaft 28 may be driven through the cone pulley at three different speeds relative to the countershaft 32. The sleeve 45 which carries the gears 44 and 46 is splined to the lathe-spindle 24 by means of a key 47, and is adjustable endwise on the lathe-spindle by means of a flange 48 on the lathe spindle through which are threaded a plurality of adjusting or set screws 49. The endwise movement or play of the lathe spindle is regulated and taken up by adjustment of the screws 49 and sleeve 45 to adjust the sleeve 45 against the inner end of the forward spindle bearing 22, while a flange 50 and washer 51 are thereby thrust toward the inner face of the rear spindle bearing 23 to limit the endwise play of the spindle 24 to any desired extent.

Outside of the rear spindle bearing 23 the spindle 24 is provided with a gear or pinion 52 which is designed to drive a train of change gears enclosed in the gear housing 53 to feed the tool carriage along the lathe ways at relatively different speeds to cut threads and effect other feeds of the tool carriage through a tool carriage feed screw 39.

Attached detachably to one end of the lathe bed 16 is the frame 54 of a belt shifter to enable the belt 40 to be readily shifted from one to another of the pulley faces on the cone pulleys 38 and 39 from the front of the lathe by turning a crank shaft 55 journaled to the frame 54 by means of a hand crank 56 or similar manually actuated means. Pivotally mounted upon a stud shaft 57 carried by the frame 54 are two belt shifter arms 58 and 59 each provided with pins 60 to engage opposite sides of the belt to shift the belt from one pulley face to another. The belt shifter arm 59 is provided with a segment 61 projecting from its side and provided with a plurality of through slots 62 and a shallow recess 63. The belt shifter arm 58 is provided with a segment 64 projecting from its side and arranged close to and concentrically relative to the segment 61. The segment 64 has a plurality of through slots 65 similar to the slots 62 and a shallow slot 66 similar to the recess 63. The slots 65 and recess 66 are so arranged that the segments 61 and 64 are substantially counterparts one of the other.

Mounted upon one end of the crank shaft 55 is a small crank wheel 67 provided with a crank pin 68 to project into engagement with the slots and recesses of the segments 61 and 64 to thereby actuate the belt shifter arms 58 and 59 in proper sequence to shift the belts successively and alternately from one pair of pulley faces to another pair of pulley faces when the crank shaft 55 is rotated in either direction and to limit the number of turns of said crank shaft 55.

Thus as shown in Figure 6 the crank pin 68 is interposed between segments 61 and 64 and is partially in the recess 66, which being too shallow to entirely receive the pin 68, serves to limit the throw of the shaft 55 and also the throw of the arms 58 and 59 in one direction. The pin 68 is also opposite one of the notches 62, and hence the shaft 55 may be turned in the reverse direction which will cause the crank pin 68 to feed the segment 61 and arm 59 toward the right hand in Figure 6 to first shift the belt from the larger to the intermediate pulley face of pulley 38, after which the belt becomes slack and the pin 68 may engage a notch 65 of the segment 64 to feed the segment 64 toward the left hand and the arm 58 toward the right hand to place the belt upon the intermediate pulley face of the pulley 39.

In like manner the belt shifting arms may be successively adjusted another step toward the right hand to shift the belt onto the right hand pulley faces in Fig. 6, whereupon the pin 68 will have entered the recess 63 thereby locking the segments and belt shifting arms against shifting the belt any further toward the right hand in Fig. 6. By turning the crank shaft 55 in the reverse direction a reverse movement of the belt shifting arms 58 and 59 may be had in which the arm 58 moves in advance of arm 59 to first provide slack in belt before the arms 59 shifts the belt onto a pulley face of larger diameter.

As illustrated in Fig. 9, a shelf 70 having a plane upper face projects from the front of the lathe bed opposite the gap 21. The apron of tool carriage 18 is provided with a threaded recess 71 into which is threaded an adjustable supporting member 72, which is provided with a lock nut 73 to lock it to its adjusted position relative to the tool carriage. The lower plane face of the member 72 is adjusted so as to rest upon the upper face of the shelf 70 and to ride thereon and act as a support for the tool carriage while the end of the tool carriage overhangs the gap 21 in the lathe bed.

In order to shift the clutch disk 34 out of engagement to stop the lathe I provide a shoe 93 which is adjustably mounted upon the lower end of a lever 94 which is pivotally attached at 95 to the lathe bed 16. The shoe 93 is forked and adapted to engage the face of the flange 36 and to overcome the tension of the spring 35 and separate the disk 34 from the pulley 33. A shaft 96 is journaled to the lathe bed and provided at one end at the front of the lathe with a hand lever 97 and at the rear of the lathe with a cam 98 to engage the edge of the lever 94 when required to release the clutch disk 34 and stop the lathe. The shoe 93 also acts as a friction brake to stop the counter-shaft as soon as clutch disk 34 is released.

The apparatus herein shown and described is capable of considerable modification without departing from the spirit of my invention.

What I claim is:

1. In a lathe a lathe headstock comprising a headstock frame, a cone pulley shaft journaled to said frame and provided with a cone pulley and a gear, a speed changing shaft journaled to said headstock frame and adjustable endwise relative thereto, said speed changing shaft being provided with a plurality of gears of different diameters one of which meshes with and is driven from the gear on the cone pulley shaft, and a lathe spindle journaled to said headstock frame and provided with a plurality of gears through which said lathe spindle may be driven at relatively different speeds from the gears on said speed changing shaft.

2. In a lathe a main frame, a headstock frame mounted rigidly upon said main frame, a counter shaft journaled to said main frame and provided with a loosely mounted driving member, a clutch to clutch said driving member to the counter shaft, a cone pulley on said counter shaft, a cone pulley shaft journaled to said headstock frame and provided with a cone pulley and a gear, a speed changing shaft jurnaled to said headstock frame and adjustable endwise relative thereto, said speed changing shaft being provided with a plurality of gears of different diameters one of which meshes with and is driven from the gear on the cone pulley shaft, and a lathe spindle journaled to said headstock frame and provided with a plurality of gears through which said lathe spindle may be driven at relatively different speeds from the gears on said speed changing shaft.

3. In a lathe in combination with a lathe headstock frame a cone pulley shaft journaled to said frame and provided with a cone pulley and a gear, a speed changing shaft journaled to said head stock frame and adjustable endwise relative thereto, said speed changing shaft being provided with a plurality of gears of different diameters one of which meshes with and is driven from the gear on the cone pulley shaft, a lathe spindle journaled to said headstock near opposite ends thereof a collar on said lathe spindle to seat as a thrust collar against the inner end of one of the lathe spindle bearings, a sleeve splined to said lathe spindle and adapted to act as a thrust collar to engage the inner end of the opposite spindle bearing and provided with a plurality of gears through which said lathe spindle may be driven at relatively different speeds from the gears on said speed changing shaft.

4. In a lathe, a lathe bed, legs supporting said bed, a counter shaft mounted on one of said legs, a pulley revolving loosely on said counter shaft, a spring seated clutch member splined to said countershaft, a shifting fork engaging the flange of said spring seated clutch member, an arm supporting said shifting fork, a manually operated cam engaging said supporting arm to start stop and brake said counter shaft and means to drive the lathe spindle from said countershaft.

5. In a lathe, a lathe bed, legs supporting said bed, a countershaft mounted on one of said legs, a pulley revolving loosely on said countershaft, a clutch member splined to said countershaft and normally yieldingly held in engagement with said loose pulley, said clutch member being provided with a shifting flange, a shifting arm pivotally supported relative to the lathe bed and provided with a shoe in engagement with said shifting flange, a manually operable shaft having a cam to engage said shifting arm and force said shoe into engagement with said shifting flange to thereby release said clutch member from engagement with said loose pulley and at the same time act as a brake to stop said countershaft, and means to drive the lathe spindle from said countershaft.

6. In a lathe, a lathe bed, legs supporting said bed, a countershaft mounted on one of said legs, a pulley revolving loosely on said countershaft, a clutch member splined to said countershaft and normally yieldingly held in engagement with said loose pulley, said clutch member being provided with a shifting flange, a shifting arm pivotally supported relative to the lathe bed and provided with a shoe in engagement with said shifting flange, a manually operable shaft having a cam to engage said shifting arm and force said shoe into engagement with said shifting flange to thereby release said clutch member from engagement with said loose pulley and at the same time act as a brake to stop said countershaft, a cone pulley carried by said countershaft, a cone pulley carried by the lathe headstock, and a belt to drive one of said cone pulleys from the other.

7. In a lathe, a lathe bed, legs supporting said bed, a countershaft mounted on one of said legs, a pulley revolving loosely on said countershaft, a clutch member splined to said countershaft and normally yieldingly held in engagement with said loose pulley said clutch member being provided with a shifting flange, a shifting arm pivotally supported relative to the lathe bed and provided with a shoe in engagement with said shifting flange, a manually operable shaft having a cam to engage said shifting arm and force said shoe into engagement with said shifting flange to thereby release said clutch member from engagement with said loose pulley and at the same time act as a brake to stop said countershaft, a cone pulley craried by said countershaft, a cone pulley carried by the lathe headstock, and a belt to drive one of said cone pulleys from the other, and a manually operable belt shifter in position to shift said cone pulley belt successively from one set of cone pulley faces to another.

8. In a lathe a lathe bed, legs supporting said lathe bed, a counter shaft mounted on one of said legs, a driving pulley loosely mounted upon said countershaft, a yieldingly energized clutch member splined to said shaft and tending to normally clutch said driving pulley to said countershaft, a shoe operable to release said clutch member from said driving pulley and at the same time to abruptly arrest the rotation of said counter shaft, means manually operable from the front of the lathe to actuate said shoe, and means to drive a lathe spindle from said counter shaft.

9. In a lathe, a lathe bed, legs supporting said lathe bed, a counter shaft mounted low down upon said legs at the rear of the lathe. A driving pulley loosely mounted upon said counter shaft, a yieldingly energized clutch member splined to said shaft and tending to normally clutch said driving pulley to said countershaft, a shoe operable to release said clutch member from said driving pulley and at the same time to abruptly arrest the rotation of said countershaft, means manually operable from the front of the lathe to actuate said shoe, and means to drive a lathe spindle from said counter shaft.

10. In a lathe, a lathe bed, a headstock secured to said bed, a main spindle journaled in said headstock, a shaft carrying a cone pulley journaled parallel to said main spindle and having variable speed geared connection with said main spindle, a countershaft mounted on the lathe bed supporting frame and provided with a cone pulley, in line with the headstock cone pulley, a bracket secured to said bed, belt shifter arms pivoted on said bracket to engage the driving belt for said cone pulleys, slots in said belt shifter arms, a shaft having a crank pin for engaging said slots for the purpose of shifting said belt to different pulley faces upon said cone pulleys.

11. In a lathe a lathe bed, a headstock rigidly mounted upon said lathe bed, a lathe spindle journaled to said headstock, a cone pulley shaft journaled to said headstock parallel to said lathe spindle, speed changing gears interposed between said cone pulley shaft and said lathe spindle to drive said lathe spindle from said cone pulley shaft, a countershaft carried by said lathe bed and provided with a cone pulley in line with and adapted to drive the cone pulley on said headstock, a cone pulley driving belt, and a belt shifter mounted upon said lathe bed and operable from the front of the lathe to shift said cone pulley belt from one set of cone pulley faces to another.

12. In a lathe a lathe bed, a headstock rigidly mounted upon said lathe bed, a lathe spindle journaled to said headstock, a cone pulley shaft journaled to said headstock parallel to said lathe spindle speed changing gears interposed between said cone pulley shaft and said lathe spindle to drive said lathe spindle from said cone pulley shaft, a countershaft mounted upon the rear of said lathe bed and provided with a cone pulley in line with and adapted to drive the cone pulley on said headstock, a cone pulley driving belt, and a belt shifter mounted upon said lathe bed and comprising a pair of belt shifting arms and a crank shaft operable from the front of the lathe to shift said cone pulley belt from one set of cone pulley faces to another.

In testimony whereof I have affixed my signature.

WILLIAM L. SCHELLENBACH.